United States Patent

Karamanev et al.

[11] Patent Number: 6,030,533
[45] Date of Patent: Feb. 29, 2000

[54] APPARATUS AND METHOD FOR THE TREATMENT OF WATER CONTAINING ORGANIC POLLUTANTS

[76] Inventors: Dimitar Karamanev; Stephane Pierre; Chantal Lafontaine; Bruce Ramsay, all of c/o R.R.#1, Harrowsmith, Ontario, Canada, K0H 1V0

[21] Appl. No.: 09/071,921

[22] Filed: May 5, 1998

[51] Int. Cl.$^7$ ..................................................... C02F 3/06
[52] U.S. Cl. ..................... 210/610; 210/617; 210/621; 210/631; 210/147; 210/150; 210/170; 210/908; 435/262.5
[58] Field of Search .................... 210/610, 611, 210/615–617, 620, 621, 631, 630, 747, 150, 151, 170, 194, 195.1, 205, 908, 909; 435/262.5

[56] References Cited

U.S. PATENT DOCUMENTS

| | | | |
|---|---|---|---|
| 5,246,309 | 9/1993 | Hobby | 210/615 |
| 5,286,140 | 2/1994 | Mather | 210/747 |
| 5,578,210 | 11/1996 | Klecka | 210/610 |
| 5,614,410 | 3/1997 | Mueller et al. | 435/262.5 |
| 5,618,727 | 4/1997 | Lajoie et al. | 435/262.5 |
| 5,766,930 | 6/1998 | Kohr | 435/262.5 |
| 5,919,696 | 7/1999 | Ikeda et al. | 435/262.5 |

OTHER PUBLICATIONS

Karamanev, Dimitre G. et al., "Soil Immobilization: New Concept for Biotreatment of Soil Contaminants", Biotechnology and Bioengineering, vol. 57, No. 4, Feb. 20, 1998. Abstract presented in the form of a poster, American Society of Microbiology, in Miami, on May 6, 1997.

*Primary Examiner*—Thomas G. Wyse
*Attorney, Agent, or Firm*—Andrew Hicks

[57] ABSTRACT

An apparatus and method for the treatment of contaminated water by biodegradation is provided. In particular, the apparatus and method are suited for the biodegradation of volatile organic compounds (VOC's) such as trichloroethylene and related compounds or benzene and related compounds. The process employs an immobilized soil bioreactor (ISBR) having a headspace re-circulation system.

20 Claims, 6 Drawing Sheets

APPARATUS AND METHOD FOR THE TREATMENT OF WATER CONTAINING ORGANIC POLLUTANTS

FIELD OF THE INVENTION

The present invention relates to an apparatus and method for the treatment of contaminated water by biodegradation. In particular, the apparatus and method are suited for the biodegradation of volatile organic compounds (VOC's) such as trichloroethylene and related compounds or benzene and related compounds. The process employs an immobilized soil bioreactor (ISBR) optionally having a headspace re-circulation system.

BACKGROUND OF THE INVENTION

Groundwater contaminants frequently have high volatilities. Examples of contaminants include benzene, toluene, ethylbenzene, xylene (BTEX compounds) and related compounds that result from gasoline spills or leaks as well as trichloroethylene (TCE) and related compounds such as dichloroethylene which are the most frequently encountered groundwater contaminants.

In the evaluation of models and processes for groundwater treatment, TCE can be used as a model compound for the evaluation of the model and has been designated as a priority pollutant by the United States Environmental Protection Agency, TCE and related compounds are only weakly toxic and carcinogenic but their degradation products (especially the vinyl chloride formed under anaerobic conditions) may be serious carcinogens. Unlike BTEX compounds, chlorinated hydrocarbons often cannot serve as the sole source of carbon and energy for most microorganisms but co-metabolism (i.e. co-oxidation) is possible. Co-metabolism results from the expression of nonspecific enzymes that degrade the primary substrate and involves the transformation of a compound that does not supply carbon or energy to the microorganism. Co-metabolism of compounds such as TCE has been found to occur with methane, toluene and $NH_4$ degrading microorganisms. Best results have been shown using methane. Unfortunately, during co-metabolism by methanotrophs, methane acts as a competitive inhibitor of methane monooxygenase, the enzyme responsible for TCE degradation. Therefore, methane concentrations must be kept relatively low.

Biofilters are beds of peat, compost or other materials that can serve as supports for microorganisms while allowing a gas phase to pass through the bed. The microorganisms may then grade organic or inorganic compounds in the gas phase. In particular, the microorganism are used to treat easily degradable compounds such as BTEX and, recently have been shown to have possible applications in TCE treatment.

Furthermore, past systems used in the degradation of VOC's have been limited as a result of the volatization of the VOC's, leading to unacceptable release of VOC's to the atmosphere. The loss of VOC's or pollutant in the gas exit stream is often a result the aeration required by many reactors. Accordingly, there has been a need for a highly effective process and apparatus for the biological degradation of both non-volatile pollutants such as pentachlorophenol (PCP0 as well as volatile pollutants such as TCE or BTEX compounds in water and, in particular, a bioreactor which minimizes the release of VOC's to the atmosphere.

Still further, there has been a need for a system which enables the treatment of volatile products of anaerobic biodegradation processes and, in particular, the effluent of an anaerobic process. For example, it is known that perchloroethylene cannot be readily degraded aerobically but can be degraded to less chlorinated compounds such as TCE and dichloroethane (DCE) anaerobically but that complete mineralization will not take place anaerobically.

SUMMARY OF THE INVENTION

In accordance with the invention, an apparatus for removing organic contaminants from water is provided, the apparatus comprising:

an immobilized soil bioreactor (ISBR), the ISBR including a reaction chamber including a top portion, a bottom portion, an aeration side and a non-aeration side, the aeration and non-aeration sides segregated by a supported soil matrix, the supported soil matrix including a microorganism culture adapted for the biodegradation of the organic compounds, the supported soil matrix extending substantially from the bottom portion to the top portion wherein the supported soil matrix allows a circulation of fluid around the supported soil matrix from the aeration side to the non-aeration side; and, a headspace re-circulation system operatively connected to the ISBR for circulating fluid around the supported soil matrix, the headspace re-circulation system including means for pumping gas phase in the top portion of the ISBR to the bottom portion of the ISBR on the aeration side of the ISBR.

In further embodiments, the ISBR includes any one of or a combination of means for introducing a solution containing contaminant into the ISBR, means for introducing a microorganism nutrient solution into the ISBR, means for introducing oxygen into the ISBR, means for introducing a co-metabolism compound into the ISBR and/or means for removing aqueous phase from the ISBR.

In a still further embodiment, the system includes biofilter operatively connected to the gas phase in the top portion of the ISBR, the biofilter including immobilized biomass for biodegradation of pollutant within the gas phase.

In a more specific embodiment, the immobilized soil contains a microbial culture adapted for the biodegradation of trichlorooethylene (TCE) or other pollutant to be treated.

The invention also provides a process for the biodegradation of organic compounds in water in an immobilized soil bioreactor (ISBR), the immobilized soil bioreactor including a reaction chamber including a top portion, a bottom portion, an aeration side and a non-aeration side, the aeration and non-aeration sides segregated by a supported soil matrix, the supported soil matrix including a microorganism culture adapted for the biodegradation of the organic compounds, the supported soil matrix extending substantially from the bottom portion to the top portion wherein the supported soil matrix allows a circulation of fluid around the supported soil matrix from the aeration side to the non-aeration side, the process comprising the steps of:

a) introducing a contaminated water stream containing any one of or a combination of organic and/or volatile organic compounds into the ISBR; and, b) circulating the contaminated water stream within the ISBR through aeration of the aeration side.

In a more specific embodiment, gas phase is collected from the top portion of the ISBR and is re-circulated to the bottom portion of the aeration side to effect fluid circulation around the supported soil matrix.

In further embodiments of the process, the process may include any of or a combination of introducing a nutrient solution, dissolved oxygen solution, and/or a co-metabolism solution into the ISBR and/or removing aqueous phase from the ISBR.

In a more specific embodiment of the process, the process includes introducing a microbial culture adapted for biodegradation of trichloroethylene or other pollutants to be treated.

Still further, the process may include subjecting the gas phase collected from the top portion of the ISBR to a downstream biofiltration process and/or operation of the device in series with at least another ISBR.

BRIEF DESCRIPTION OF THE DRAWINGS

These and other objects of the invention will be more apparent from the following description in which reference is made to the appended drawings wherein.

DETAILED DESCRIPTION OF THE INVENTION

Figure 1:
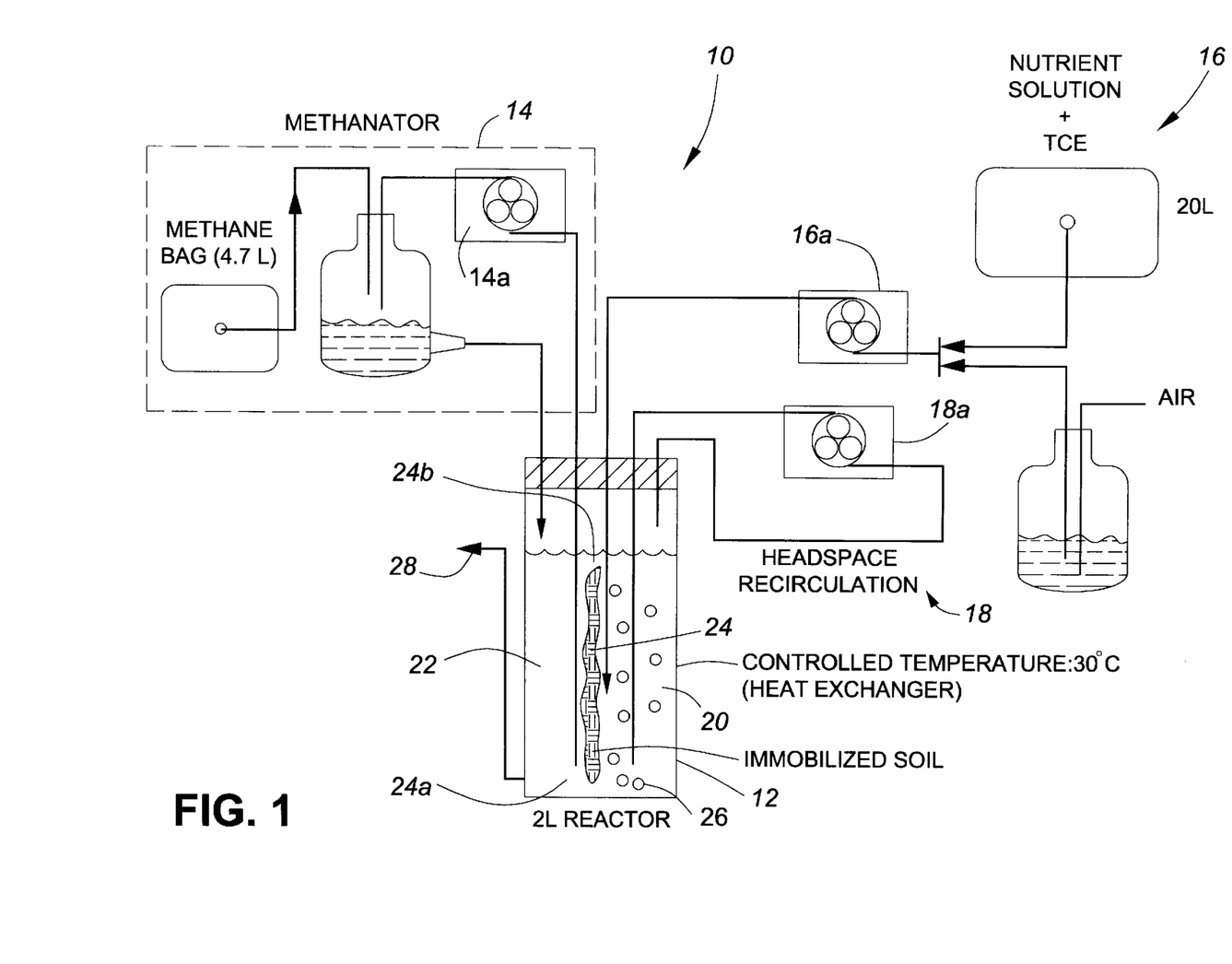
FIG. 1 is a schematic process diagram of a laboratory scale reactor in accordance with the invention.
Figure 1A:
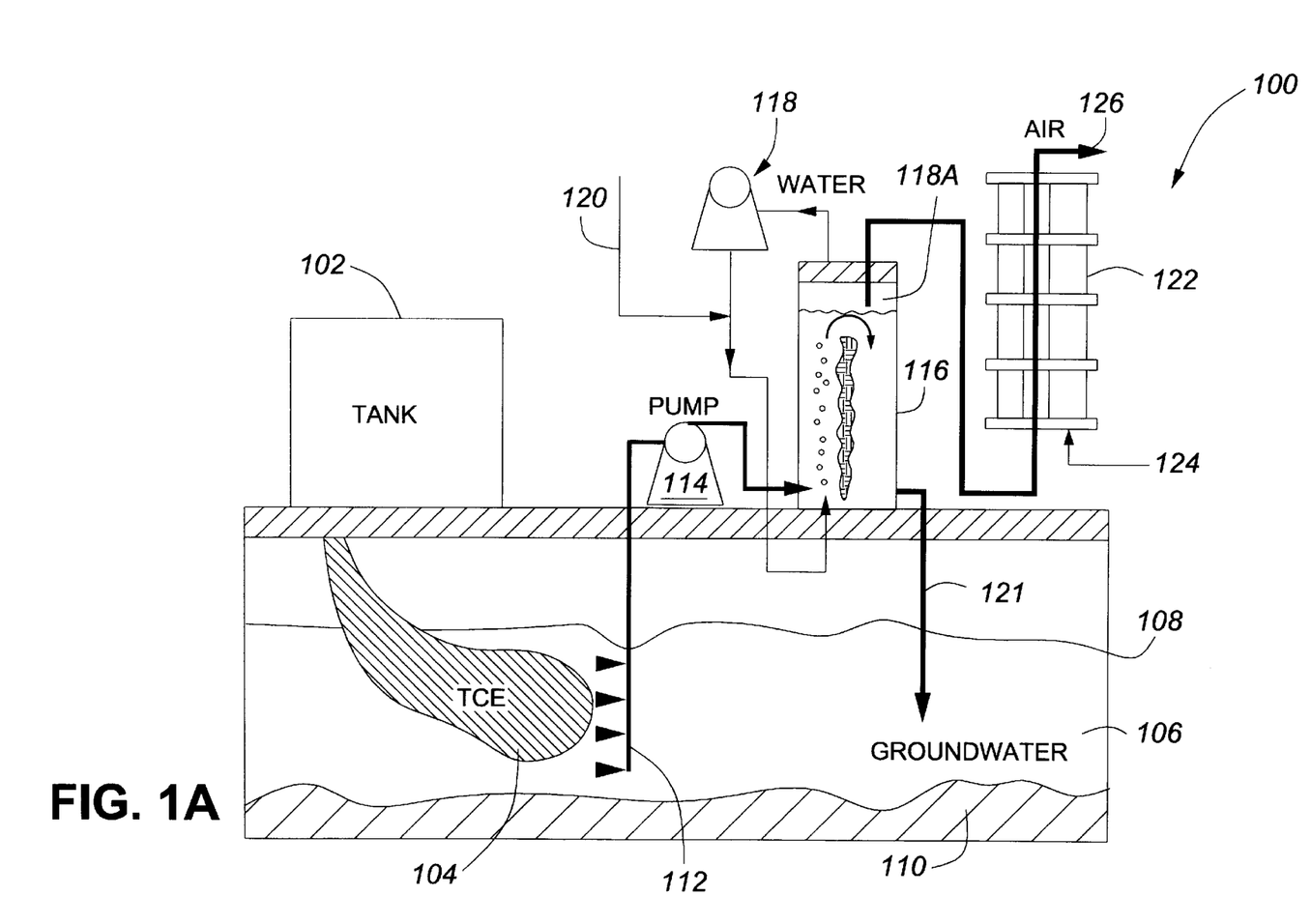
FIG. 1A is a schematic process diagram of an industrial scale reactor in accordance with the invention.

With reference to FIGS. 1 and 1A, laboratory and industrial scale reactor systems having an immobilized soil bioreactor (ISBR) are shown. With reference to FIG. 1, the system 10 includes an ISBR reactor 12, a co-metabolism system 14, a contaminant supply system 16 and a headspace re-circulation system 18. Generally, the ISBR reactor 12 supports a microorganism culture which is capable of mineralizing a volatile or non-volatile pollutant delivered from the contaminant supply system 16, the contaminant supply system containing the contaminant as well as the nutrients and oxygen required to support the microorganism culture. A co-metabolism system 14 may be required where the microorganism culture requires additional compounds, such as methane, toluene or ammonium to facilitate the biodegradation efficiency.

The reactor 12 is preferably a cylindrical chamber which is centrally divided into an aeration side 20 and a non-aeration side 22 by an immobilized soil region 24 described in "Soil Immobilization: New Concept for Biotreatment of Soil Contaminants, Karamanev et al., Biotechnologoy and Bioengineering, Vol. 57, No. 4, (1998)" and which is incorporated herein by reference. The immobilized soil region 24 preferably includes a geotextile supporting matrix which entrains soil within the reactor against the matrix. The geotextile is an appropriate membrane having a pore size sufficient to trap soil circulating within the reactor while also permitting a degree of water circulation through the entrapped soil.

As indicative above, the reactor includes an aeration side 20 and a non-aeration side 22. During operation, an aerating gas 26 is released at the bottom of the reactor whereupon it rises to the surface of the aerating side 20. The rising gas lowers the density of fluids on the aeration side 20 allowing a circulation of fluid to occur between the aeration 20 and non-aeration sides of the reactor. In order to facilitate the movement of fluid between the two sides, it is preferable that the immobilized soil region 24 provides a space 24a at the bottom of the reactor and another space 24b at the top of the reactor 12 to permit a consistent circulation of fluid between the two sides.

A nutrient solution containing microorganism nutrients and dissolved oxygen is also introduced into the reactor 12. In the embodiment shown in FIG. 1, the nutrient solution is introduced with the contaminant and dissolved oxygen by pump 16a.

Furthermore, a co-metabolism solution may also be introduced into the reactor, if necessary to maximize the efficiency of the specific microorganisms within the reactor. In the embodiment shown in FIG. 1, methane is dissolved in a nutrient solution and introduced into the reactor 12 by pump 14a.

A decontaminated product stream 28 of spent nutrient and water is withdrawn from the reactor 12 to maintain a steady volume of fluid in the reactor 12.

Gases released at the surface of the liquid phase of the reactor are collected and pumped by pump 18a through the headspace recalculation system 18 and returned to the bottom of the reactor 12 as the aerating gas 26. Accordingly, any VOC's released to the gas phase are collected and re-circulated through the reactor 12.

With reference to FIG. 1A, a field scale water treatment system 100 is shown as a typical installation for the treatment of contaminated groundwater. A tank 102 has leaked a quantity of a pollutant 104, for example TCE, to the groundwater 106. The pollutant 104 is shown below the water table and above any bedrock 110 which may be present in the formation. A well 112 is drilled to enable the contaminated groundwater to be pumped to the surface by pump 114. The pump 114 delivers contaminated groundwater to an ISBR 116 as described above. Furthermore, a headspace recirculation system 118 is provided through which headspace gas is collected and recirculated to the base of the reactor 116. Addition of an aerating gas, oxygen and possibly a co-metabolism compound may be introduced through pipe 120 into the headspace recirculation system as required or, alternatively, directly into the reactor 116 through a separate inlet system (not shown).

Decontaminated water is re-introduced to the ground through pipe 121 from the reactor 116.

In addition to the ISBR reactor 116, the system may be provided with a biofilter system 122 for the further decontamination of volatized pollutant released to the headspace 118a. the biofilter 122 utilizes a bed of compost or other suitable materials to support to microorganisms to further facilitate the biodegradation of volatile pollutants from the gaseous phase. Accordingly, gas from the headspace 118a is passed through the biofilter 122 along with additional air and/or cometabolism compounds (pipe 124), if necessary, to continue the biodegradation of the pollutant. Decontaminated gas phase may be released to the atmosphere through pipe 126.

The ISBR reactor and biofilter may be operated in series to effect biodegradation where desired results and system parameters warrant.

EXAMPLES

The following examples are illustrative of the effectiveness of the system in the decontamination of water. In these examples, TCE was used as a model compound for the development and study of the invention because it is one of the most commonly found groundwater contaminants, is highly volatile and is relatively difficult to biodegrade. Some of its relevant characteristics are given in Table 1.

TABLE 1

Some Physical Properties of Trichloroethylene

| Property | Value |
| --- | --- |
| Molecular weight | 131.39 g mol$^{-1}$ |
| Melting point | −84.8° C. |
| Boiling point (760 mm Hg) | 86.7° C. |
| Aqueous solubility at 20° C. | 1000 mg L$^{-1}$ |
| Vapour pressur | |
| at 20° C. | 60 mm Hg |
| at 30° C. | 95.5 mm Hg |
| Henry's constant at 25° C. | 8.92 × 10$^{-3}$ atm m$^3$ mol$^{-1}$ |
| Density at 25° C. | 1.460 g ml$^{-1}$ |
| $K_{ow}$ (log) | 2.42 |
| $K_{oc}$ (log) | 2.10 |

Source: Perry et al., (1997) et Merck Index (1996)

In all of the following examples the operational conditions were as follows unless otherwise indicated.

Chemicals and Stock Solutions

For radioactive labelling $^{14}$C was used. The [$^{14}$C]TCE (Sigma Chemicals, St. Louis, Mich.) used had a purity greater than 98% and a specific activity of 5.4 mCi/mM. A nutrient stock solution was prepared in deionized water with NaNO$_3$ (2 mM), phosphate buffer (2 mM) (KH$_2$PO$_4$ (3.9 mM) and Na$_2$HPO$_4$ (6.0)), MgSO$_4$.7H$_2$O (50 μM) and FeSO$_4$.7H$_2$O (80 μM) (Anachemia, Montréal, Québec). The TCE and the hexane (laboratory grade) came from Anachemia. The methane and air mixture (air: CO$_2$ (20% of CO$_2$ v/v)) came from Air liquid Canada.

Laboratory-Scale Reactor System

As described above and as shown in FIG. 1, the laboratory-scale system incorporated three separate subsystems: 1) a contaminant supply unit for the addition of TCE, nutrient and dissolved oxygen; 2) a co-metabolism system (methanator) for the addition of methane; and, 3) an immobilized soil bioreactor.

During large-scale use of the system, it may not be necessary to use the co-metabolism sub-system as co-metabolism compounds and air can be added as a gas directly into the bottom of the reactor as in a typical air-lift reactor. For the purpose of laboratory investigations, to co-metabolism system was used at a laboratory-scale facilitate accurate analysis of oxygen and methane usage.

The unit for the addition of TCE and nutrient was composed of a Tedlar™ bag (20.3 L) (Cole Parmer, Vernon Hills, Ill.) and a water tank. The Tedlar™ bag was used to contain TCE and nutrient solution. The bag was utilized to avoid the TCE volatilization. A 23 L water tank was used to add dissolved oxygen in the reactor. The methanator was composed of a Teflon™ (polytetrafluoroethylene) bag (4.7 L) (Cole Parmer) filled with methane and an aspirator bottle (V=1 L) (VWR Canlab, Mississauga, Ont.) on a stirring plate. The mass transfer of methane was executed inside the bottle. All the tubing inside the methanator was stainless steel (316-SS, O.D.=3.18 mm) and the tubing which connected the reactor with the methanator was in Tygon™ SE-200 (I.D.=3.18 mm and O.D.=6.35 mm). The immobilized soil bioreactor was a 2 L cylinder glass reactor sealed with a rubber stopper (size; interior dia.=77 mm, exterior dia.=90 mm, thickness=40 mm). Inside the reactor a geotextile (H=36.4 cm, L=7.8 cm t=0.5 cm) contain the immobilized soil (2.55 g). The temperature inside (T=29.5° C.–30.8° C.) was controlled by thermal exchange with a tubing (U form) through which cool water was passed. All tubing inside the reactor was in stainless steel. The agitation and circulation of the liquid phase interior the bioreactor was performed by recirculating the headspace gas using a pump.

Measurement of Dissolved Oxygen

Dissolved oxygen (DO) concentration was measured with a Model YSI-5739 oxygen meter (Yellow Spring Instruments inc., Yellow Spring, Ohio) that had been calibrated in air-saturated water (9.09 mg L$^{-1}$ at 20° C.).

Measurement of Dissolved Methane

Measurement of dissolved methane concentration was determined by headspace analysis. 10 ml of liquid for methane analysis was injected with a glass syringe (model 1010, Hamilton) into an evacuated 12 ml glass vial (Wheaton) with a butyl rubber seal. The pressure was equilibrated with atmospheric air. The vial was shaken vigorously by hand for 30 seconds. 50 μL of the gas phase was removed with a 250 μL gas-tight syringe, then injected into a Hewlett-Packard model 5890 (column HP-1, 15 m×0.53 m×0.15 μm) with a flame ionization detector (FID). The temperature for the oven was increased from 60° C. to 90° C. at a rate of 15° C./min and 90° C. to 120° C. at a rate of 10° C./min. Injector and detector temperature were maintained at 90° C. and 220° C., respectively. The carrier gas was helium (134 kPa). A integrator (HP-3396 A) was coupled with the GC to analyze the constituent of the gas phase. Quantification of the unknown sample was achieved by a calibration curve (correlation coefficient of 0.99) for the methane. This method gave the gaseous methane concentration. The dissolved methane concentration was calculated using equation 1.

$$[CH_4]_L = [CH_4]_g \cdot V_g / V_L \quad (1)$$

TCE Degradation

TCE degradation was determined by syringe extractions in hexane (sample:hexane, 1:1 (v/v)) followed by gas chromatography (capillary column HP-5, 25 m×0.2 mm×0.33 μm) with an electron capture detector (ECD) analysis using 1,2-dibromoethane (EDB) as an internal standard. A 1 μL sample of the extract was injected automatically (Hewlett-Packard model HP-7673) into the GC. The program temperature for the oven was increased from 45° C. to 150° C. at a rate of 15° C./min, held at 150° C. for one minute followed by a 150° C. to 120° C. decrease at a rate of 10° C./min. Injector and detector temperature were maintained at 150° C. and 250° C., respectively. The retention time obtained for TCE and 1,2-dibromoethane was 2.89 min. and 4.15 min., respectively. Quantification of the unknown sample was achieved by injecting standards that had been treated like samples and comparing the relative areas with an integrator (HP-3396 A) (correlation coefficient of 0.99).

[$^{14}$C]TCE Mineralization

The study of mineralization was performed in serological bottles (120 ml) which contained 60 ml of nutrient, 20 ml of aqueous phase from the reactor (or 10 g of solid phase from the biofilter with no added nutrient solution), a CO$_2$ trap (1 ml KOH 1 M), a mixture of gas CH$_4$:air (1:1 v/v) and with various radioactive TCE concentrations (1 to 15 ppm). Abiotic control samples were prepared for each TCE concentration by using $NaN_3$ (0.2% m/v). Microcosms were incubated in the dark at room temperature. Mineralization was determined by measuring the evolution of $^{14}CO_2$ from [$^{14}C$]TCE. Radioactive $CO_2$ was trapped in 1 ml of 1 M KOH. Another 1 ml of KOH to rinse the trap. The 2 ml samples were added to 10 ml of liquid scintillation counter fluid and mixed vigorously. $^{14}CO_2$ levels were determined with a liquid scintillation counter (model LSC 1409, Wallac Scintillation Products, England).

Soil was added to an aerated ISBR which had previously contained no soil. The optical density (660 nm) of the medium immediately increased to about 1.1 but after 46 h it had returned to the original optical density indicating that the soil was almost totally immobilized.

Figure 2:
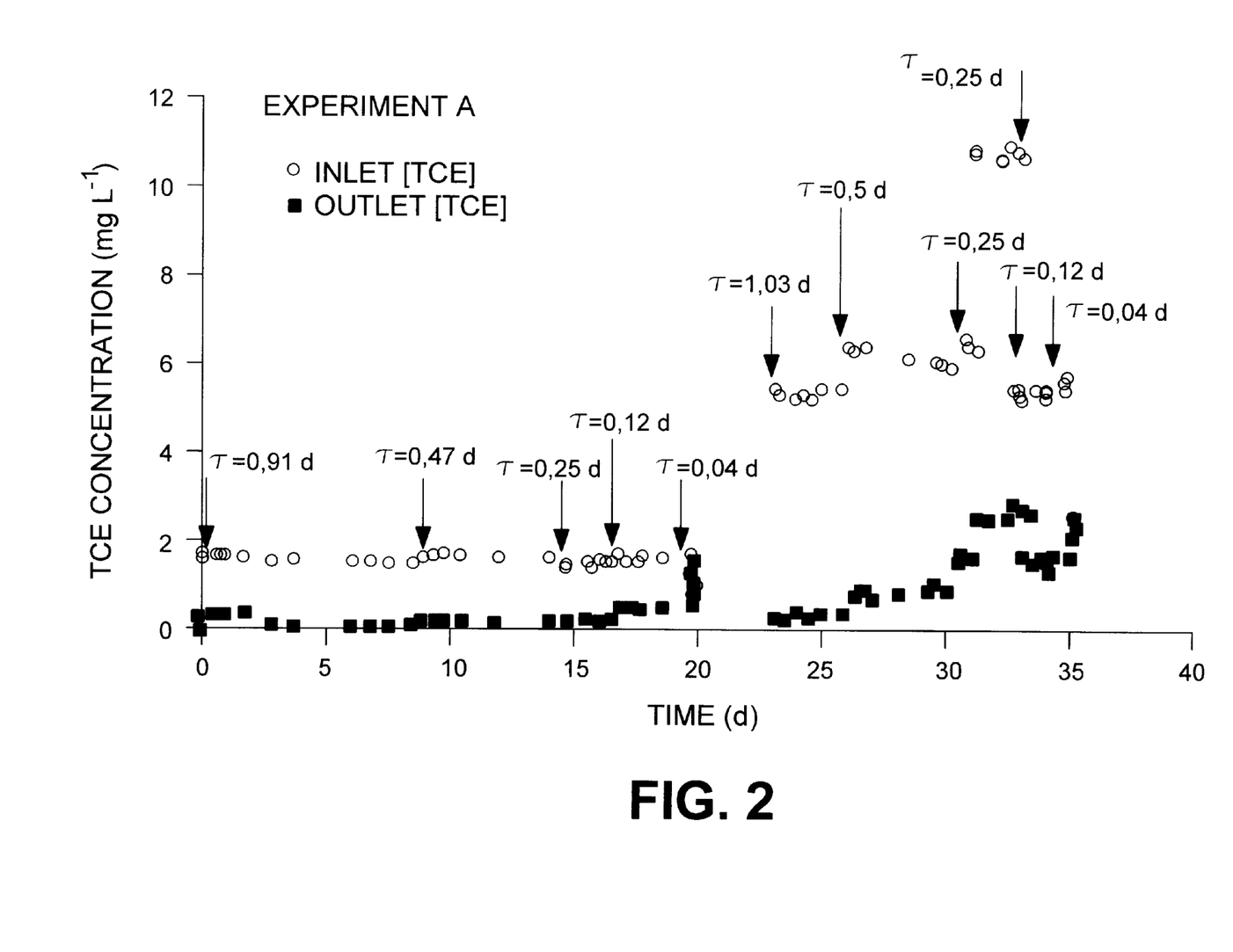
FIG. 2 is a graph of Experiment A showing TCE concentration vs. time.
Figure 3:
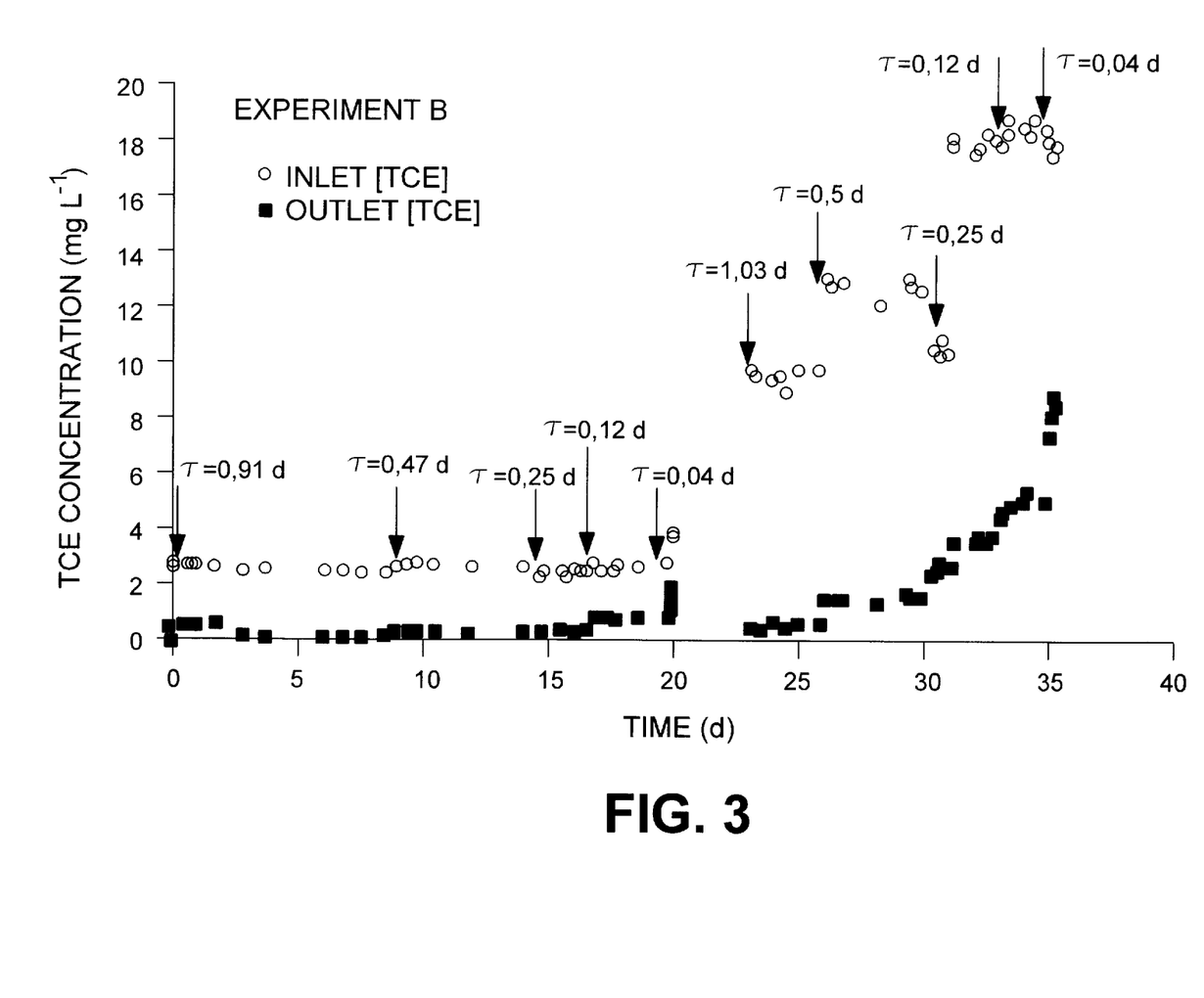
FIG. 3 is a graph of Experiment B showing TCE concentration vs time.

Two experiments were carried out to assess the ability of the ISBR to degrade TCE. In these experiments, the reactor was loaded with soil as described above and supplied with methane to develop a methanotrophic bacterial population. The soil was collected from the aerobic/anaerobic interface of a swamp to provide the desired microorganisms and, in particular, methanotrophs. TCE was then fed at various feed rates, different amounts of methane supplied and the hydraulic residence time was varied to produce the results shown in FIGS. 2 and 3. These figures show raw data that demonstrates the TCE degradation efficiency of the ISBR operated under methanotrophic conditions. In general the amount of TCE degraded (difference between the circles (TCE in the feed) and the squares (TCE leaving the reactor) increased with the amount of TCE fed and with the residence time. Results were compared with the results previously obtained with other reactors by other researchers. These comparisons are shown in Table 2 and show that the system of the invention was much more efficient at TCE biodegradation than previous stirred tank reactor systems at similar residence times and TCE outlet (ie, reactor) concentrations.

TABLE 2

Comparison of the results of TCE biodegradation in a methanotrophic IFBR with other published reports of reactor-based TCE degradation.

| Publication | [TCE]in (mg L$^{-1}$) | [TCE] out (mg L$^{-1}$) | Residence time (d) | Maximal degradation rate (mg TCE L$^{-1}$ d$^{-1}$) | Efficiency (% TCE removal) |
|---|---|---|---|---|---|
| Lanzaronne et al. 1990 | 0.025 | 0.0185 | 0.02 | 0.33 | 26 |
| Arvin, 1991 | 1.2 | 0.924 | 0.2 | 1.38 | 23 |
| Fennel et al. 1993 | 11.3 | 8.6 | 0.11 | 24.5 | 23.9 |
| Aziz et al. 1995* | 0.097 | 0.075 | 0.0065 | 3.38 | 22.7 |
| This work | 2.26 | 0.061 | 0.91 | 2.42 | 97.3 |
| This work | 18.12 | 8.46 | 0.042 | 230 | 53.3 |

*Bioreactor employing a pure methanotrophic strain

Figure 4:
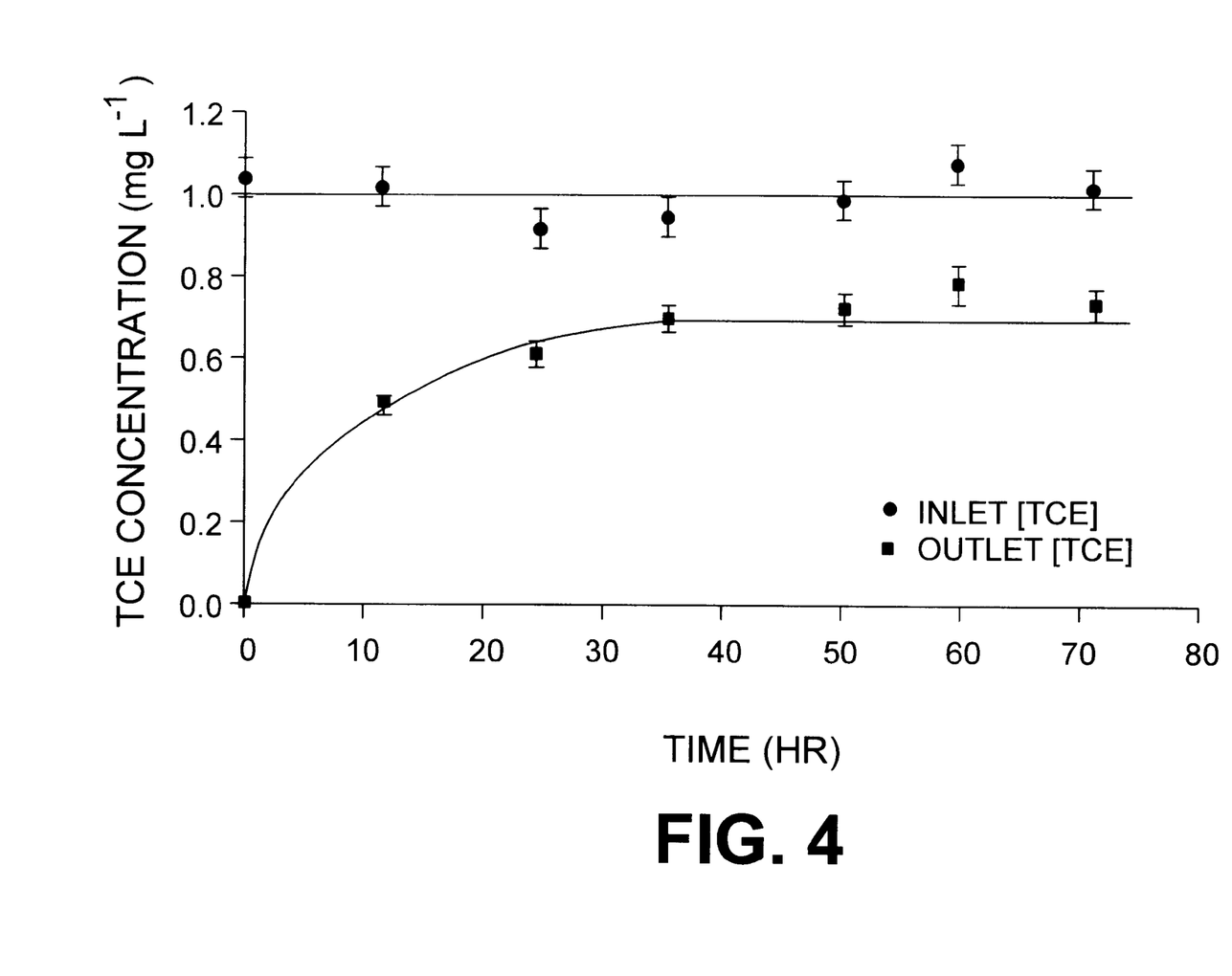
FIG. 4 is a graph showing TCE concentration vs. time for an experiment using the IFBR without geotextile and with sparging.
Figure 5:
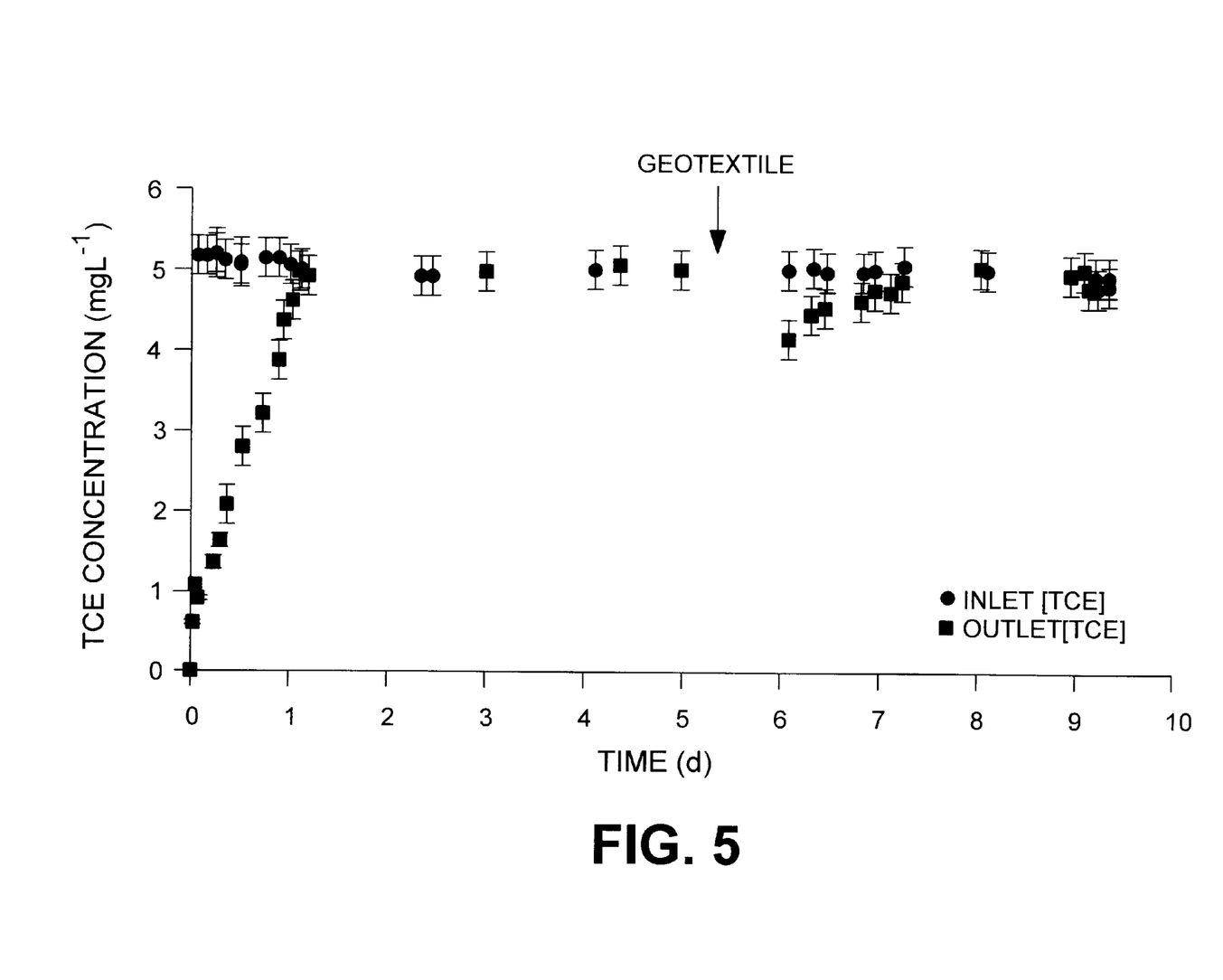
FIG. 5 is a graph showing TCE concentration vs. time for an experiment using the IFBR, initially without geotextile and without sparging.

The lab-scale ISBR was usually operated without aeration, instead using dissolved oxygen in the incoming aqueous phase (water+medium) as the oxygen source. However, in one experiment, the ISBR was operated without geotextile (therefore no immobilized soil so little or no microorganisms) and with or without aeration by bubbling (sparging). The liquid residence time was 6 hours and the aeration rate (when aerated) was 0.5 L min$^{-1}$. As shown in FIG. 4 for an experiment without geotextile and with sparging, the outlet TCE concentration in the aqueous stream never reaches the inlet concentration. This shows that a significant portion of the TCE (about 25%) must have been transferred to the gas phase due to its volatility. FIG. 5 shows the results of using the IFBR, initially without geotextile, but without sparging. The inlet and outlet TCE concentrations were usually very similar except at one point (as shown if FIG. 5) where geotextile support was added resulting in a small amount of TCE sorption to the geotextile.

Headspace Recirculation

Operating the system in a recirculation mode caused a steady decrease in the TCE concentration in both the aqueous and gaseous phases of the reactor.

Biofilter

In a large-scale mode of operation, the addition of co-metabolism compounds and air addition may require sparging wherein the reactor off-gases would contain volatile pollutant (in this case TCE). For this reason, the use of a downstream biofilter was investigated. Results of a series of methanotrophic biofiltration experiments are given in Tables 2, 3, 4, and 5.

A stainless steel biofilter with a diameter of 0.097 m and 0.5 m in height was used for the biofiltration assays. The biofilter bed was composed of compost and perlite (50% w/w). Biofiltration experiments showed a linear relationship between TCE degradation rate and TCE concentration at the biofilter inlet. TCE inlet concentrations were varied from 0.06 and 23 mg L$^{-1}$. The inlet $CH_4$ concentration was relatively constant at 4% v/v and the gaseous flow was 2.3 L min$^{-1}$. TCE degradation rates of up to 43.5 g TCE m$^{-3}$ h$^{-1}$ (0.315 mol TCE m$^{-3}$ réacteur h$^{-1}$) were obtained. At initial $CH_4$ concentrations lower than 1.1% v/v, the competition between $CH_4$ and TCE was not detectable.

TABLE 3

Operation of the biofilter at an initial $CH_4$ concentration of 0.076 mmol L$^{-1}$

|  | Entrance | Exit |
|---|---|---|
| [$CH_4$] (% v/v) | 0.170 | 0.135 |
| [$CH_4$] (mmol L$^{-1}$) | 0.076 | 0.060 |
| [TCE] (mg L$^{-1}$) | 1.82 | 0.76 |
| [TCE] (mmol L$^{-1}$) | 0.0140 | 0.0058 |
| C/C$_0$ $CH_4$ | 1 | 0.794 |
| C/C$_0$ TCE | 1 | 0.418 |
| % $CH_4$ consumption |  | 20.59 |
| % TCE degradation |  | 58.24 |
| Volume (L) |  | 3.7 |
| Flow rate (L min$^{-1}$) |  | 2.529 |
| Residence time (minutes) |  | 1.463 |
| Rate of $CH_4$ consumption (mol $CH_4$ m$^{-3}$ reactor h$^{-1}$) |  | 0.643 |
| Rate of TCE degradation (mol TCE m$^{-3}$ reactor h$^{-1}$) |  | 0.331 |

TABLE 4

Operation of the biofilter at an initial $CH_4$ concentration of 0.161 mmol L$^{-1}$.

|  | Entrance | Exit |
|---|---|---|
| [$CH_4$] (% v/v) | 0.36 | 0.31 |
| [$CH_4$] (mmol L$^{-1}$) | 0.161 | 0.139 |
| [TCE] (mg L$^{-1}$) | 1.54 | 0.73 |
| [TCE] (mmol L$^{-1}$) | 0.0117 | 0.0056 |
| C/C$_0$ $CH_4$ | 1 | 0.861 |
| C/C$_0$ TCE | 1 | 0.474 |

TABLE 4-continued

Operation of the biofilter at an initial $CH_4$ concentration of 0.161 mmol $L^{-1}$.

|  | Entrance | Exit |
|---|---|---|
| % $CH_4$ consumption |  | 13.89 |
| % TCE degradation |  | 52.6 |
| Volume (L) |  | 3.7 |
| Flow rate (L min$^{-1}$) |  | 2.393 |
| Residence time (minutes) |  | 1.546 |
| Rate of $CH_4$ consumption (mol $CH_4$ m$^{-3}$ reactor h$^{-1}$) |  | 0.872 |
| TCE degradation rate (mol TCE m$^{-3}$ reactor h$^{-1}$) |  | 239 |

TABLE 5

Operation of the biofilter at an initial $CH_4$ concentration of 0.500 mmol $L^{-1}$.

|  | Entrance | Exit |
|---|---|---|
| [$CH_4$] (% v/v) | 1.1 | 1 |
| [$CH_4$] (mmol L$^{-1}$) | 0.5 | 0.45 |
| [TCE] (mg L$^{-1}$) | 1.6 | 0.74 |
| [TCE] (mmol L$^{-1}$) | 0.0122 | 0.0056 |
| $C/C_0$ $CH_4$ | 1 | 0.909 |
| $C/C_0$ TCE | 1 | 0.463 |
| % $CH_4$ consumption |  | 9.09 |
| % TCE degradation |  | 53.75 |
| Volume (L) |  | 3.7 |
| Flow rate (L min$^{-1}$) |  | 2.578 |
| Residence time (minutes) |  | 1.435 |
| Rate of $CH_4$ consumption (mol $CH_4$ m$^{-3}$ reactor h$^{-1}$) |  | 1.906 |
| TCE degradation rate (mol TCE m$^{-3}$ reactor h$^{-1}$) |  | 273 |

TABLE 6

Operation of the biofilter at an initial $CH_4$ concentration of 2.15 mmol $L^{-1}$.

|  | Entrance | Exit |
|---|---|---|
| [$CH_4$] (% v/v) | 4.6 | 4.41 |
| [$CH_4$] (mmol L$^{-1}$) | 2.15 | 2.06 |
| [TCE] (mg L$^{-1}$) | 1.02 | 0.7573 |
| [TCE] (mmol L$^{-1}$) | 0.078 | 0.0057 |
| $C/C_0$ $CH_4$ | 1 | 0.959 |
| $C/C_0$ TCE | 1 | 0.735 |
| % $CH_4$ consumption |  | 4.13 |
| % TCE degradation |  | 26.47 |
| Volume (L) |  | 3.7 |
| Flow rate (L min$^{-1}$) |  | 2.505 |
| Residence time (minutes) |  | 1.477 |
| Rate of $CH_4$ consumption (mol $CH_4$ m$^{-3}$ reactor h$^{-1}$) |  | 3.78 |
| TCE degradation rate (mol TCE m$^{-3}$ reactor h$^{-1}$) |  | 83 |

The biofiltration experiments showed that a varied inlet concentration of methane with a relatively constant inlet concentration of TCE resulted in TCE degradation.

TCE mineralization experiments were performed using either biomass from the ISBR or samples of the biofilter bed. Depending on the conditions, both usually produced well in excess of 50% of the theoretical $CO_2$ production from the initial TCE showing that complete mineralization is possible with either the ISBR or the biofilter biomass either singularly or in combination.

The terms and expressions which have been employed in this specification are used as terms of description and not of limitations, and there is no intention in the use of such terms and expressions to exclude any equivalents of the features shown and described or portions thereof, but it is recognized that various modifications are possible within the scope of the claims.

REFERENCES

1. ARVIN, E. (1991). Biodegradation kinetics of chlorinated aliphatic hydrocarbons with methane oxidizing bacteria in an aerobic fixed biofilm reactor. *Water Res.* 25: 873–881.

2. AZIZ, C. E., FIETCH, M. W., LINQUIST, L. K., PRESSMAN, J. G. GEORGIOU, G. et SPEITEL, Jr, G. E. (1995). Methanotrophic biodegradation of trichloroethylene in a hollow fiber membrane bioreactor. *Env Sci Technol*, 29(10): 2574–2583.

3. BOWMAN, J. P. et SAYLER, G. S. (1994). Optimization and maintenance of soluble methane monooxygenase activity in *Methylosinus trichosporium* OB3b. *Biodegradation*, 5: 1–11.

4. FENNELL, D. E., NELSON, Y. M., UNDERHILL, S. E., WHITE, T. E. et JEWELL, W. J. (1993). TCE degradation in a methanotrophic attached-film bioreactor. *Biotechnol Bioeng*, 42: 859–872.

5. KARAMANEV, D. G., CHAVARIE, C, et SAMSON, R. (1997). Soil immobilization: a new concept for biotreatment of soil contaminants. *Biotechnol Bioeng*, 57:471–476.

6. LANZARONE, N. A. et McCARTY, P. L. (1990). Column studies methanotrophic degradation of trichloroethylene and 1,2-dichloroethane. *Ground Water*, 28(6):910–919.

7. *MERCK Index*. (1996). An encyclopedia of chemicals, drugs and biologicals, 12th edition, Merck and Co. inc., Whitehouse Station, N.J.

8. PERRY, Robert H., GREEN, Don W. et MALONEY, James O. (1997). *Perry's Chemical Engineers Handbook*, 7th ed., McGraw-Hill.

We claim:

1. An apparatus for removing organic contaminants from water comprising:
   an immobilized soil bioreactor (ISBR), the ISBR including a reaction chamber including a top portion, a bottom portion, an aeration side and a non-aeration side, the aeration and non-aeration sides segregated by a supported soil matrix, the supported soil matrix including a microorganism culture adapted for the biodegradation of the organic compounds, the supported soil matrix extending substantially from the bottom portion to the top portion wherein the supported soil matrix allows a circulation of fluid around the supported soil matrix from the aeration side to the non-aeration side; and,
   a headspace re-circulation system operatively connected to the ISBR for circulating fluid around the supported soil matrix, the headspace re-circulation system including means for pumping gas phase in the top portion of the ISBR to the bottom portion of the ISBR on the aeration side of the ISBR.

2. An apparatus as in claim 1 wherein the ISBR includes means for introducing a solution containing contaminant into the ISBR.

3. An apparatus as in claim 1 wherein the ISBR includes means for introducing a microbial nutrient solution into the ISBR.

4. An apparatus as in claim 1 wherein the ISBR includes means for introducing oxygen into the ISBR.

5. An apparatus as in claim 1 wherein the ISBR includes means for introducing a co-metabolism compound into the ISBR.

6. An apparatus as in claim 1 wherein the ISBR includes means for removing aqueous phase from the ISBR.

7. An apparatus as in claim 1 further comprising a biofilter operatively connected to the gas phase in the top portion of the ISBR, the biofilter including immobilized biomass for biodegradation of pollutant within the gas phase.

8. An apparatus as in claim 1 wherein the immobilized soil contains a microbial culture adapted for the biodegradation of trichloroethylene (TCE).

9. An apparatus as in claim 2 wherein the ISBR includes means for introducing a microorganism nutrient solution into the ISBR.

10. An apparatus as in claim 9 wherein the ISBR includes means for introducing oxygen into the ISBR.

11. An apparatus as in claim 10 wherein the ISBR includes means for introducing a co-metabolism compound into the ISBR.

12. An apparatus as in claim 11 wherein the ISBR includes means for removing aqueous phase from the ISBR.

13. An apparatus as in claim 12 further comprising a biofilter operatively connected to the gas phase in the top portion of the ISBR, the biofilter including immobilized biomass for biodegradation of pollutant within the gas phase.

14. An apparatus as in claim 13 wherein the immobilized soil contains a microbial culture adapted for the biodegradation of trichloroethylene (TCE).

15. A process for the biodegradation of organic compounds in water in an immobilized soil bioreactor (ISBR), the immobilized soil bioreactor including a reaction chamber including a top portion, a bottom portion, an aeration side and a non-aeration side, the aeration and non-aeration sides segregated by a supported soil matrix, the supported soil matrix including a microorganism culture adapted for the biodegradation of the organic compounds, the supported soil matrix extending substantially from the bottom portion to the top portion wherein the supported soil matrix allows a circulation of fluid around the supported soil matrix from the aeration side to the non-aeration side comprising the step of:

a) introducing a contaminated water stream containing any one of or a combination of organic and/or volatile organic compounds into the ISBR; and, b) circulating the contaminated water stream within the ISBR through aeration of the aeration side.

16. A process as in claim 15 wherein gas phase collected from the top portion of the ISBR is re-circulated to the bottom portion of the aeration side to effect fluid circulation around the supported soil matrix.

17. A process as in claim 15 further comprising the step of introducing any one of or a combination of a nutrient solution, dissolved oxygen solution, or a co-metabolism solution into the ISBR or removing aqueous phase from the ISBR.

18. A process as in claim 15 wherein step a) further includes introducing a microorganism culture adapted for biodegradation of trichloroethylene.

19. A process as in claim 15 further comprising the step of subjecting gas phase collected from the top portion of the ISBR to a downstream biofiltration process.

20. A process as in claim 15 wherein the ISBR is operated in series with at least another ISBR.

* * * * *